United States Patent [19]

Pinney

[11] Patent Number: 5,018,921

[45] Date of Patent: May 28, 1991

[54] LOCKING SCREW FOR MODULAR FRAMEWORK

[76] Inventor: Richard C. Pinney, 2100 Deodar St., Santa Ana, Calif. 92701

[21] Appl. No.: 563,086

[22] Filed: Aug. 6, 1990

[51] Int. Cl.⁵ .................... F16B 35/00; F16B 7/00; F16B 12/36
[52] U.S. Cl. .................................. 411/393; 411/410; 411/959; 403/7; 403/297
[58] Field of Search ............. 411/393, 187, 188, 403, 411/404, 408, 410, 911, 959; 403/7, 246, 297, 292, 295

[56] References Cited

U.S. PATENT DOCUMENTS

| 2,556,155 | 6/1951 | Stellin | 411/410 |
|---|---|---|---|
| 3,079,185 | 2/1963 | Foster . | |
| 3,269,250 | 8/1966 | Curtiss | 411/410 |
| 3,854,831 | 12/1974 | Gutner . | |
| 3,858,989 | 1/1975 | Field . | |
| 4,076,438 | 2/1978 | Bos . | |
| 4,249,830 | 2/1981 | Day . | |
| 4,355,552 | 10/1982 | Gutshall . | |
| 4,402,625 | 9/1983 | Rechkin . | |
| 4,448,003 | 5/1984 | Hasbrouck . | |
| 4,764,068 | 8/1988 | Crispell . | |
| 4,893,958 | 1/1990 | Wieland . | |

Primary Examiner—Neill R. Wilson
Attorney, Agent, or Firm—Newport Law Offices

[57] ABSTRACT

A locking screw is disclosed having a shank and a frustoconical head with a cavity therein and a knurled annular end surface portion encircling the cavity. The locking screw is disposed within the arm of a joint connecting member which arm is inserted in a tubular structural member. The screw is turned out from the arm into engagement with the structural member holding the joint and structural member securely together.

16 Claims, 2 Drawing Sheets

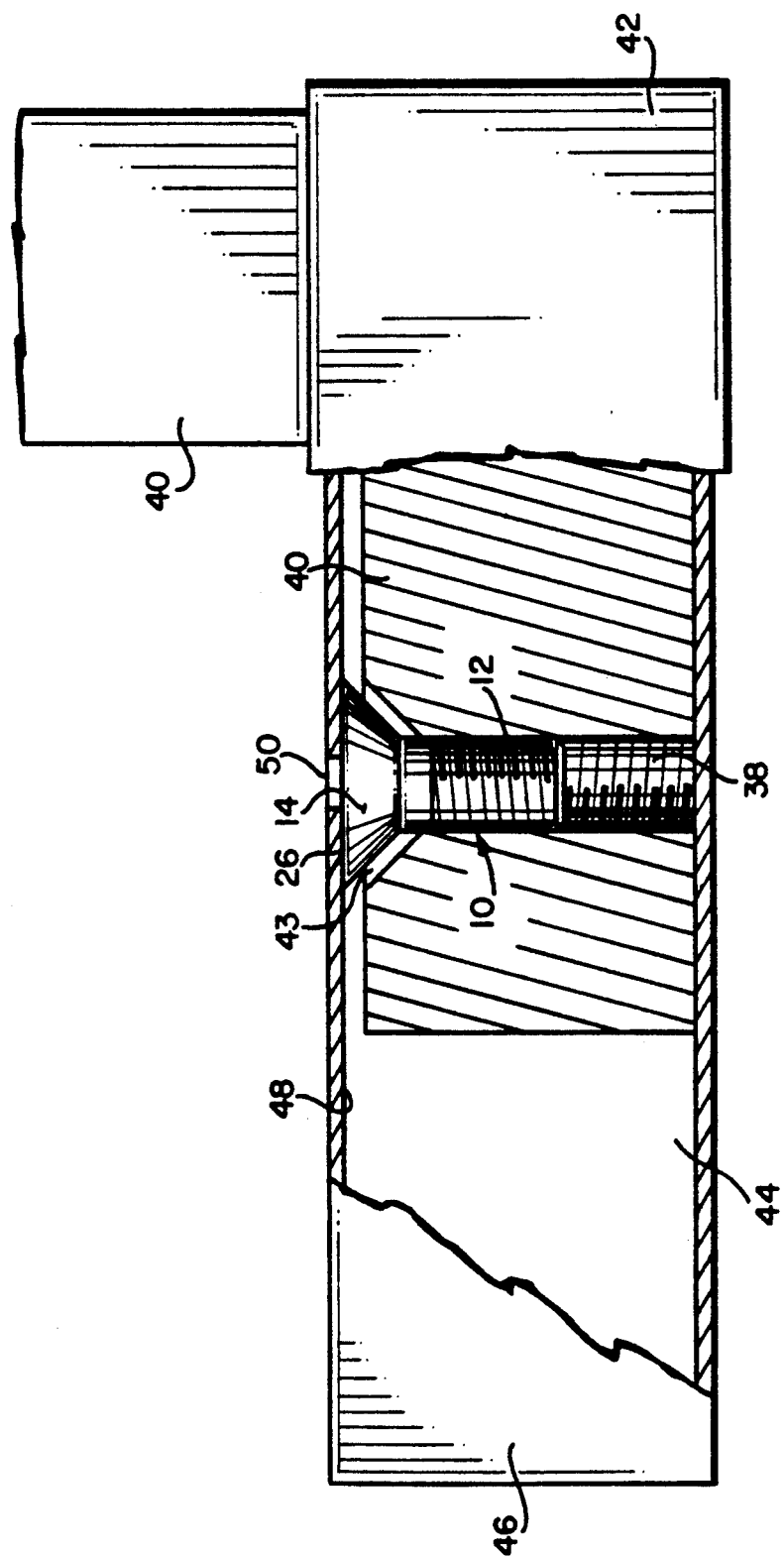

LOCKING SCREW FOR MODULAR FRAMEWORK

BACKGROUND OF THE INVENTION

1. Field of the Invention

The invention relates generally to threaded fasteners and more particularly to screws having improved locking features for modular framework.

2. Description of Related Art

Many conventional frames, cabinets, tables, partitions and other similar items are made of modular components such as square tubular members which are interconnected by sliding them over projecting arms of a corner connector. Screws inserted into the arms are turned into engagement with the interior wall of the tubular members to secure the corner connector and tubular members together. Modular type assemblies of the above-described nature are widely used in the consumer industry for everything from patio furniture to garage cabinets because the components parts can be readily packaged and the end user can provide the assembly.

Typical examples of conventional modular structures are illustrated in U.S. Pat. Nos. 3,858,989 and 3,854,831. In U.S. Pat. No. 3,858,989, a modular corner joint is disclosed which includes tubular members and a hub corner connector with protruding arms. Conical set screws are inserted into threaded holes which extend laterally through the arms. Once assembled the set screws are backed into a hole in the tubular member such that the screw engages the inner surface of the hole and ultimately locks the tubular member against the corner hub. In U.S. Pat. No. 3,854,831, a corner fitting has projecting arms. Before assembly bolts are inserted into threaded holes in the arms. The tubular members are slid over the arms, and the bolts are backed into the inner wall of the tubular members via an access hole in the wall of the tubular member. Each bolt has a head portion which extends into the access hole and pushes against the inner wall of the access hole, thereby urging the tubular member and the arm into clinching engagement.

While the above described threaded fasteners have meet with a certain amount of success, the interconnected joint arrangements disclosed in these patents are still susceptible to loosening due to vibration or shock because the fastening screws do not provide sufficient surface resistance. Furthermore, in many applications modular joints are not used for fabricating cabinets, frames, tables or partitions because conventional modular structures are not sufficiently stiff or stable. Instead, welded structures are preferred which offer stability, but disadvantageously are very labor intensive to fabricate and therefore expensive.

Therefore, it would be an advancement to the art to provide a simple, inexpensive means to fasten modular components together in stable relationship.

SUMMARY OF INVENTION

It is therefore an object of the present invention to provide fasteners for modular framework components that more readily resist loosening due to shock or vibration.

It is another object of this invention to provide fasteners for modular framework which are simple and inexpensive to manufacture yet reliable.

It is still another object of the present invention to provide fasteners for modular framework that can be utilized without the need for any special tools by lay persons without any special skills.

A locking screw according to the present invention includes a threaded shank and a head portion at one end of the shank. The head portion has an outer frustoconical side surface and an essentially flat annular end surface portion, which encircles a recessed cavity. The flat annular surface portion has a roughened surface. A socket cavity extends through the bottom portion of the recessed cavity into the threaded shank, providing means to tighten the screw by means of a tool. In use, the locking screw is inserted into the arm of the a corner member, the arm being slid into a tubular member. The locking screw is backed into and tighten against the inner wall of the tubular member such that the flat annular end surface portion of the head engages the inner wall of the tube. The roughened surface grips the inner wall and readily resist disengagement due to vibration and shock.

Other and further objects, advantages and characteristics features of the present invention will become readily apparent from the following detailed description of preferred embodiments of the invention when taken in conjunction with the accompanying drawings.

BRIEF DESCRIPTION OF THE DRAWINGS

FIG. 4 is a partially broken away side view of a modular assembly utilizing a locking screw in accordance with the principles of the invention.

DESCRIPTION OF PREFERRED EMBODIMENTS

Figure 2:
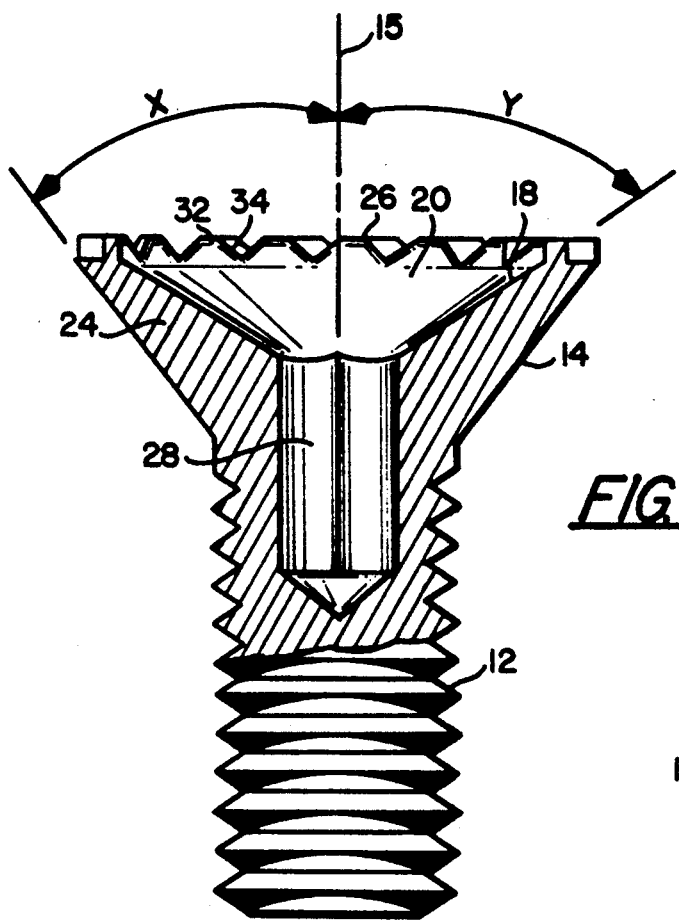
FIG. 2 is a partially broken away side view of the locking screw of FIG. 1.
Figure 1:
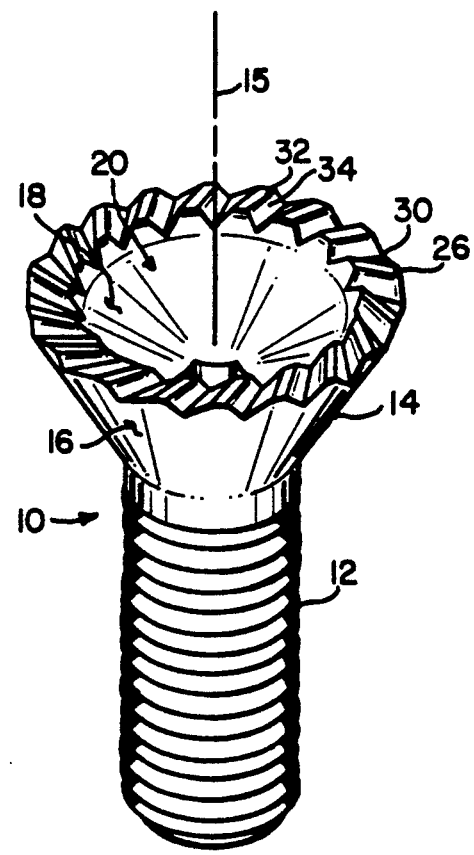
FIG. 1 is a perspective view of a locking screw in accordance with the principles of the invention.
Figure 3:
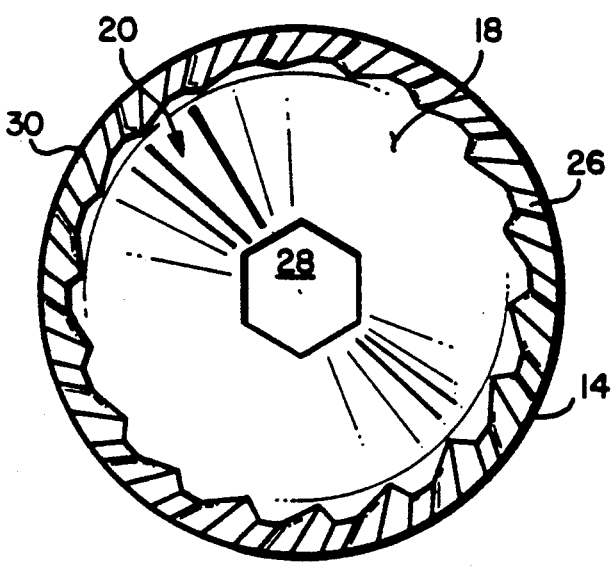
FIG. 3 is a top view of the locking screw in FIG. 1.

Referring now with more particularity to the drawings, wherein like or similar parts are designated by the same numerals throughout the various figures, FIGS. 1-3 illustrate a locking screw 10 having a threaded shank 12 and a head portion 14 disposed along a longitudinal axis 15. Head portion 14 has a generally frustoconical outer surface 16 which tapers outwardly from the shank 12 at a predetermined angle "X" to the longitudinal axis 15. The head portion 14 further has a central recessed cavity 20 extending inwardly from the end of the head 14, which cavity terminates into counterbore 28. The central cavity has a generally frustoconical inner surface 18 which tapers outwardly from counterbore 28 at a second predetermined angle "Y" with respect to longitudinal axis 15. The outer and inner frustoconical surfaces 14 and 18 form wall 24 therebetween, which wall terminates into annular surface portion 26, which encircles central cavity 20. The counterbore 28 is preferably hexagonal in cross-section and extends from the central cavity 20 into shank 12 along the longitudinal axis 15 providing a socket means for a tool such as an allen wrench or screw driver, for example.

The predetermined taper angles Y, X for the inner and outer frustoconical surfaces 18, 14 are preferably selected such that the thicknesses of wall decreases from the bottom surface 22 to the annular surface portion 26. The predetermined taper angle for frustoconical outside surface 14 may preferably be in range from about 35° to 45° and more preferably in the range from about 38° to 42° with respect to longitudinal axis 15;

while frustoconical inner surface 18 may form an angle of taper of 45° to 55° and more preferably 48° to 52° with respect to longitudinal axis 15.

The annular surface portion 26 has a roughened texture to provide an improved gripping effect. Such roughened texture preferably takes the form of circumferential knurl 30. The circumferential knurling 30 comprises a plurality of alternating spaced crests 32 and groves 34. The crests and grooves may extend radially outward from the longitudinal axis. However, a preferred arrangement of crests 32 and grooves 34 for a right hand threaded screw is illustrated wherein the crests and grooves extend across the annular surface portion in a slanted clockwise direction. Alternately, for left hand threaded screws, the direction of knurling preferably would be the opposite, namely slanted counterclockwise (not shown). Slanting the crest and grooves across the annular surface portion increases the effective length of crests and grooves thereby providing for more griping power during use.

An illustrated use of the locking screw is shown in FIG. 4, for example (reference may also be made to U.S. patent application Ser. No. 348,562 which has been allowed and is incorporated herein by reference). The locking screw 10 is screwed into a threaded hole 38 of arm 40 of connecting member 42. The threaded hole 38 has a countersink 43 at one end thereof to receive the frustoconical head portion 14 of locking screw 10. Connecting member 42 may be a one piece monolithic element having a plurality of arms 40 for interconnecting one, two, three or more tubular structural members in a corner arrangement (in this example only one tubular structural member 46 is shown). The arms 40 may be of the same general cross-sectional configuration as the cross-sectional opening of structural member 46, but of a slightly small size so as to be slidably insertable into the end portion of the structural member. The arm 40 with locking screw 10 are inserted within hole 44 of tubular structural member 46. The locking screw 10 is tighten by backing it out of the threaded hole 38 and against the inside wall 48 of the tubular member 46 using a tool (not shown) such as an allen wrench via access hole 50. The annular surface portion 26 engages the inner wall 48 of the tubular structural member, the knurl crests of locking screw 10 penetrating and cutting into inner wall 48. The crests cut burrs from the inner wall which provide resistance to the screw from moving. The knurling therefore provides gripping power to add frictional resistance to inhibit undesirable loosening of the screw in shock or vibration environments. Additionally, the central cavity 20 allows a hole plug (not shown) to be inserted into access hole 50, thereby giving the exterior of the structural member 46 a smooth appearance.

The above-described detailed description of preferred embodiments described the best mode contemplated by the inventor for carrying out the present invention at the time this application was filed and is offered by way of example and not by way of limitation. Accordingly, various modifications may be made to the above-described preferred embodiments without departing from the scope of the invention. For example, the head portion could be cylindrically shaped having a cylindrically shaped central cavity. Additionally, the roughened annular surface portion could have a plurality of rigids, protrusions or beads providing the frictional resistance desired to prevent loosening of the screw. Although metallic materials may be used to form the various above-described components, namely the structural members, corner members and locking screws, these components may be made of other materials, such as plastic. Accordingly, it should be understood that although the invention has been described and shown for various particularly embodiments, nevertheless various changes and modifications obvious to a person of ordinary skill in the art to which the invention pertains are deemed to lie within the spirit and scope of the invention as set forth in the following claims.

What is claimed is:

1. A locking screw for modular framework, comprising:
   a threaded shaft having a longitudinal axis and having two ends, and
   a head portion having a frustoconical outer surface disposed along said longitudinal axis at one end of said shaft, said head portion having an end with a recessed cavity therein with a frustoconical inner surface, said outer and inner surfaces forming a wall therebetween which tapers in thickness in the direction away from the shaft into an annular surface portion encircling the recessed cavity, said annular surface portion having a roughened texture.

2. The locking screw defined in claim 1 wherein said annular surface portion roughened texture comprises a plurality of ridges.

3. The locking screw defined in claim 1 wherein said roughened texture comprises knurling.

4. The locking screw defined in claim 3 wherein said knurling comprises alternating crests and grooves.

5. The locking screw defined in claim 4 wherein said alternating crests and crests extending radially outward from said longitudinal axis.

6. The locking screw defined in claim 1 wherein said frustoconical outer surface has an angle of taper in the range of from about 35° to 45° relative to the longitudinal axis.

7. The locking screw defined in claim 6 wherein said frustoconical inner surface has an angle of taper in the range of from about 45° to 55° relative to the longitudinal axis.

8. The locking screw defined in claim 1 wherein the frustoconical outer surface has an angle of taper in the range of from about 38° to 42° relative to the longitudinal axis.

9. The locking screw defined in claim 8 wherein the frustoconical inner surface has an angle of taper in the range of from about 45° to 55° relative to the longitudinal axis.

10. A modular corner arrangement for framework structures, comprising:
    at least one tubular member having a hole therethrough;
    a corner member having at least one arm with a threaded hole traversely therethrough, said arm slidably inserted into the hole of said at least one tubular member, and
    at least one locking screw having a shaft portion and head portion having a frustoconical outer surface, the head portion having an end with a frustoconically shaped cavity therein, the frustoconical outer surface and cavity forming a wall therebetween which tapers in thickness in the direction away from the shaft terminating into an annular surface portion encircling the cavity, the annular surface portion having a roughened texture, wherein said licking screw is threaded into said threaded hole and backed into engagement with the tubular member for holding said tubular member and corner member in secure relationship.

11. The modular corner arrangement defined in claim 10 wherein said roughed texture comprises knurling.

12. A locking screw for securing a tubular member and corner member together, comprising:
   a threaded shank having a longitudinal axis, and
   a frustoconical shaped head portion disposed on one end of said threaded shank along said longitudinal axis, said head portion having an end with a recessed cavity therein and an annular surface encircling the cavity, said annular surface having a roughened texture, and further having a hex-shaped counterbore extending from the bottom of the recessed cavity along said longitudinal axis a predetermined distance into said threaded shank.

13. The locking screw defined in claim 12 wherein said cavity has frustoconical inner surface.

14. The locking screw defined in claim 13 wherein said inner and outer surface form a wall therebetween which tapers in thickness in the direction away from said shank.

15. A locking screw for securing a tubular member and corner member together, comprising:
   a threaded shank having a longitudinal axis, and
   a frustoconically shaped head portion disposed along said longitudinal axis at one end of the shaft, said head portion having an end with a frustoconically shaped recessed cavity and a ring shaped end surface portion encircling the recessed cavity, and further having a counterbore extending from the bottom of said recessed cavity along said longitudinal axis a predetermined distance into said threaded shank for providing a socket means to manipulate the locking screw.

16. A modular corner arrangement for framework structures, comprising:
   at least one tubular member having a hole therethrough;
   a corner member having at least one arm with a threaded hole traversely therethrough, said arm slidably inserted into the hole of said at least one tubular member, and
   at least one locking screw having a shaft portion and head portion having a frustoconical outer surface, the head portion having an end with a cavity therein and an annular surface portion encircling the cavity and further having a counterbore extending from the bottom of said recessed cavity along said longitudinal axis a predetermined distance into said shaft portion the annular surface portion having a roughened texture, wherein said locking screw is threaded into said threaded hole and backed into engagement with the tubular member for holding said tubular member and corner member in secure relationship.

* * * * *